(12) United States Patent
Ohyama

(10) Patent No.: US 6,588,048 B2
(45) Date of Patent: Jul. 8, 2003

(54) WIPER-BLADE DEVICE

(75) Inventor: Yoshisuke Ohyama, Tokyo (JP)

(73) Assignee: Y. Corporation, Tokyo (JP)

( * ) Notice: Subject to any disclaimer, the term of this patent is extended or adjusted under 35 U.S.C. 154(b) by 5 days.

(21) Appl. No.: 09/892,541

(22) Filed: Jun. 28, 2001

(65) Prior Publication Data

US 2002/0053112 A1 May 9, 2002

(30) Foreign Application Priority Data

Jun. 28, 2000 (JP) ........................................ 2000-195033

(51) Int. Cl.⁷ ............................... B60S 1/38; B60S 1/48; B60S 1/28
(52) U.S. Cl. ................................ 15/250.43; 15/250.44; 15/250.451; 15/250.04; 15/250.48; 15/250.41
(58) Field of Search ................................ 15/245, 250.48, 15/250.43, 250.44, 250.451, 250.361, 250.41, 250.4, 250.04

(56) References Cited

U.S. PATENT DOCUMENTS

| | | | | |
|---|---|---|---|---|
| 2,080,129 A | * | 5/1937 | Gulotta | 15/250.41 |
| 3,328,825 A | * | 7/1967 | Anderson | 15/250.48 |
| 3,545,028 A | * | 12/1970 | Poland | 15/250.48 |
| 6,266,843 B1 | * | 7/2001 | Doman et al. | 15/250.201 |

FOREIGN PATENT DOCUMENTS

| | | | | |
|---|---|---|---|---|
| GB | 862036 | * | 3/1961 | 15/250.451 |
| GB | 2212055 | * | 7/1989 | 15/250.43 |
| JP | 62-265052 | * | 11/1987 | 15/250.48 |
| JP | 1-226459 | | 9/1989 | |
| JP | 2588688 | | 11/1998 | |

* cited by examiner

*Primary Examiner*—Gary K. Graham
(74) *Attorney, Agent, or Firm*—Jacobson Holman PLLC

(57) ABSTRACT

To enable a curved surface of a large curvature to be more effectively wiped, a wiper-blade device has notched portions in each blade section at required intervals to allow the blade section to bend easily so as to follow a curved surface to be wiped. The notched portions are disposed so that those of one of the blade sections do not overlap those of the other in the wiping direction, and for the purpose of providing a desired bent shape for the blade sections with the notched portions formed therein, elastic bending plates are attached to a holder section to which the blade sections are attached, and the blade sections each have a more sharply bent shape at the ends thereof than in the other portions thereof.

3 Claims, 6 Drawing Sheets

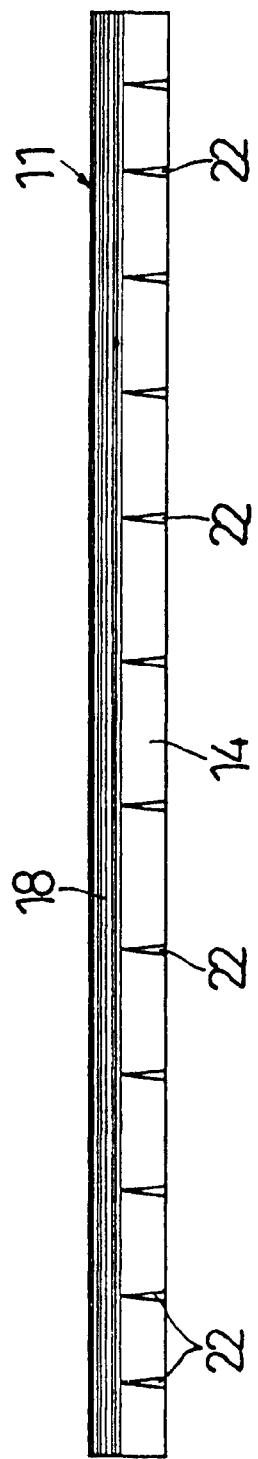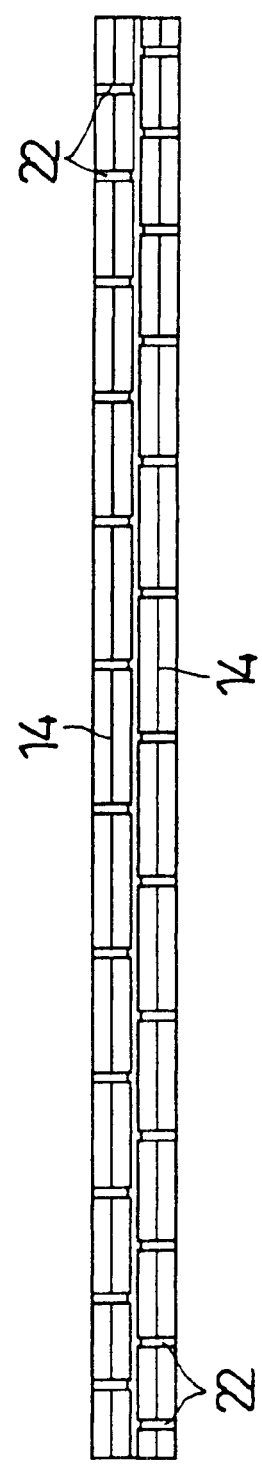

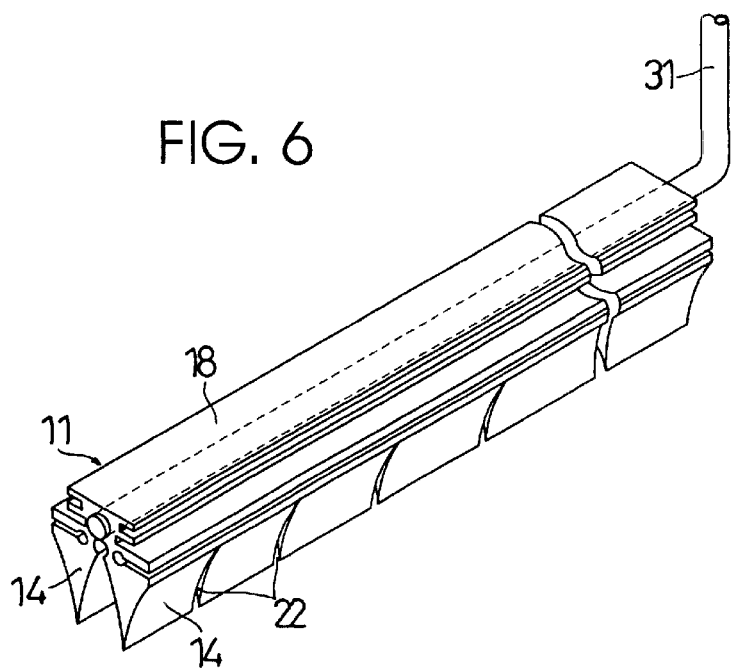
FIG. 6
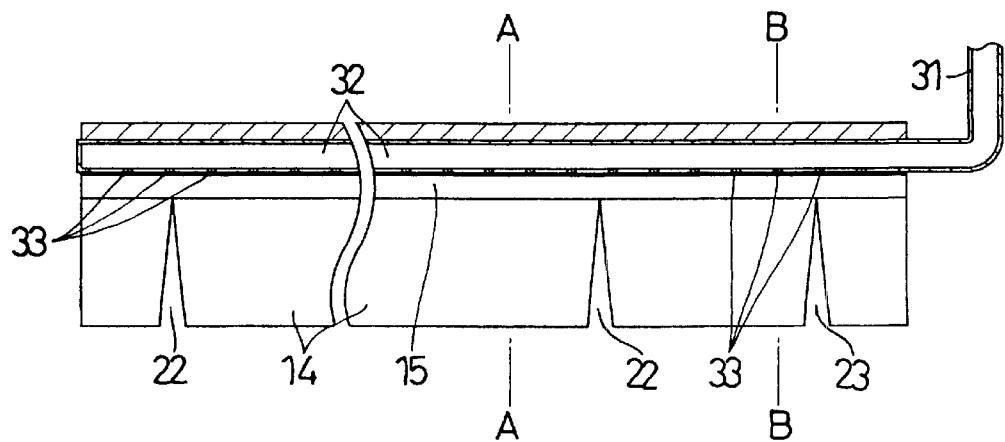
FIG. 7
FIG. 8(a)
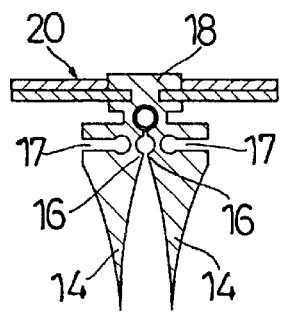
FIG. 8(b)
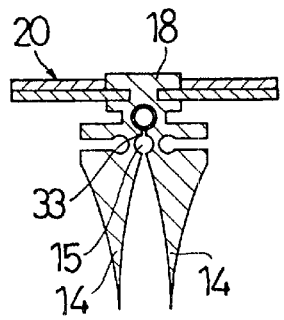

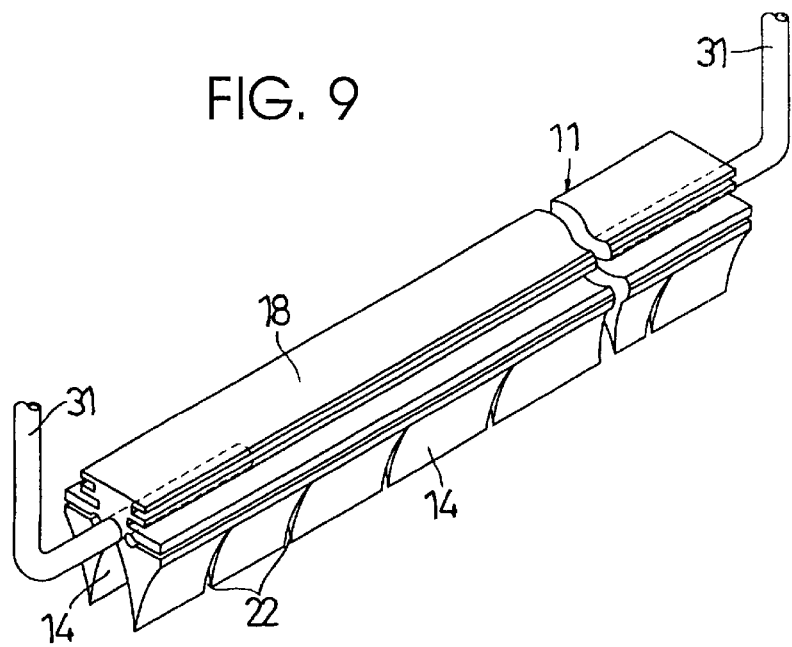
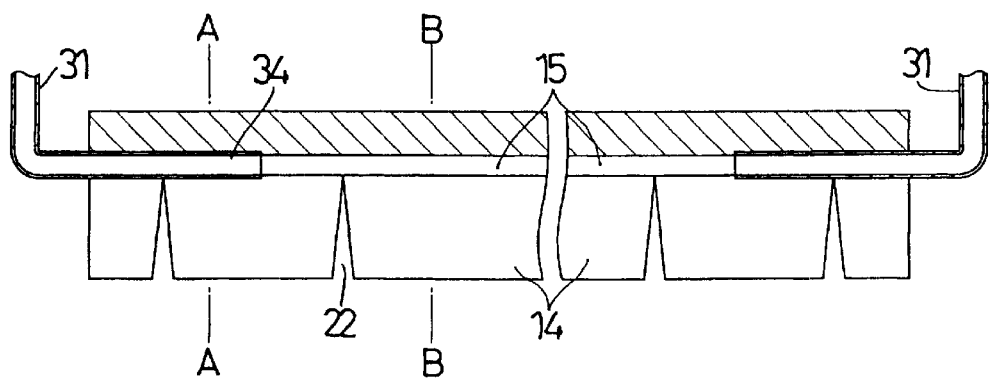
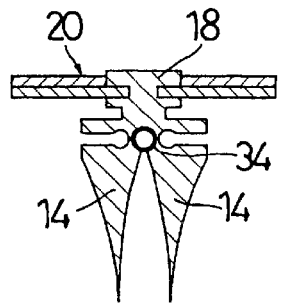 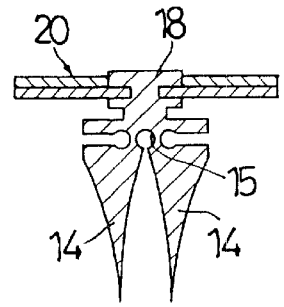

WIPER-BLADE DEVICE

DETAILED DESCRIPTION OF THE INVENTION

1. Field of the Invention

The present invention relates to a wiper-blade device which can use a wiper blade having a two-blade structure.

2. Description of the Prior Art

Wipers for use in automobiles and the like have been improved in various ways. Wipers using a wiper blade composed of two blades are known to those skilled in the art (Laid-open Japanese Patent Application Publication (Tokkai Hei) No. 1-226459 and others). The wiper device disclosed in this prior art provides a more stable and reliable wiping effect on a curved surface of a small curvature than those having a single blade. The wiper blade, however, does not bend easily along the curved surface to be wiped, and thus hardly come into contact with the curved surface. The both ends of the blade are likely to rise from, for example, a curved surface of a large curvature, and excessive pressure is exerted on the central portion of the blade. Thus, disadvantageously, the entire wiping effect is degraded, and the blade is worn away more quickly in its center.

The device of the Registered Japanese Utility Model No. 2588688 is more advantageous for a curved surface to be wiped that has a large curvature. This utility model has been provided by the inventor based on his examinations of deformation of the curved surface. However, it is still insufficient to handle automobile front windshield that has a large curvature. Furthermore, problems remain to be solved with the conventional wipers; for example, it may be subjected to strong air resistance, it is likely to rise during high-speed driving, and windshield washing liquid may be splashed.

SUMMARY OF THE INVENTION

The present invention is provided in view of the above points, and it is an object thereof to make it possible to wipe a curved surface such as an automobile windshield that has a large curvature and is significantly bent. It is another object of the present invention to provide a wiper-blade device that can operate stably even while the automobile is traveling at a high speed, and which does not waste windshield washing liquid.

These and other objects can be attained by a wiper-blade device that has notched portions formed at required intervals in each blade section, so that the device can bend so as to follow a curved surface to be wiped, wherein the notched portions are formed so that those of one of the two blade sections do not overlap those of the other.

DETAILED DESCRIPTION OF THE PREFERRED EMBODIMENT

A wiper-blade device according to the present invention may comprise a wiper blade having a single-blade structure or a double-blade structure. A wiper blade having a double-blade structure provides more effective wiping because a first blade located forward in the wiping direction serves to execute a preprocess, whereas a second blade located rearward in the same direction serves to perform actual wiping. This wiper blade, however, is similar to that having a single-blade structure in other points.

The wiper-blade device is composed of a wiper blade having a single-blade structure or a double-blade structure and a holder section for holding the wiper blade. The wiper blades of the single- and double-blade structures can be used interchangeably in the holder section.

The holder section to which the blade section is attached has elastic bending plates attached thereto. The elastic bending plates provide a predetermined bent shape for the blade section, which is formed so as to bend easily; the elastic bending plates themselves can be elastically deformed. The elastic bending plates allow the blade section to have a more sharply bent shape at the both ends thereof than in the other portion thereof, that is, the intermediate portion thereof, which is separate from the both ends.

The wiper blade of the double-blade structure may be of an integral type that integrally has two blade sections, or of a separate type with which a separate blade section is used. Means for attaching the wiper blade to a reciprocating arm of the wiper are provided in the holder section (see FIG. 1).

Each blade section has notched portions formed at required intervals in a longitudinal direction thereof. The notched portions comprise notches that extend from the tip of the blade section to the root thereof, and allow the wiper blade to bend easily. To avoid leaving traces of wiping, the notched portions are arranged so that those of the front-blade section do not overlap those of the rear-blade section.

The wiper-blade device having a double-blade structure also enables windshield washing liquid to be supplied to a curved surface to be wiped, from between the two blade sections. The liquid is supplied through a pipe arranged in the holder section, and an appropriate number of nozzles are provided in the pipe at appropriate locations thereof so as to eject the externally supplied windshield washing liquid therefrom. Furthermore, the holder section has a generally triangular cross section so that, during a fast operation, the blade can be pressed against the curved surface to be wiped, by means of air currents.

BRIEF DESCRIPTION OF THE DRAWINGS

FIG. 4 is a front view of a wiper blade.

FIG. 5 is a bottom view of the wiper blade.

FIG. 6 is a perspective view showing a second example of a liquid-supplying piping system.

FIG. 7 is a vertical sectional view of the second example.

FIG. 8(a) is a sectional view taken along line A—A in FIG. 7, and FIG. 8(b) is a sectional view taken along line B—B in FIG. 7.

FIG. 9 is a perspective view showing a third example of the liquid-supplying piping system.

FIG. 10 is a vertical sectional view of the third example.

FIG. 11(a) is a sectional view taken along line A—A in FIG. 10, and FIG. 11(b) is a sectional view taken along line B—B in FIG. 10.

EMBODIMENTS

Figure 1:
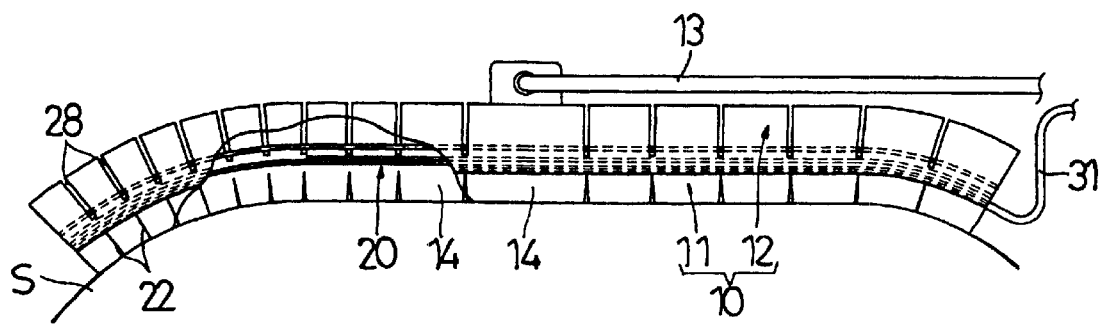
FIG. 1 is a front view showing an embodiment of a wiper-blade device according to the present invention.

The present invention will be described below in detail with reference to the illustrated embodiments. This wiper-blade device 10 is composed of a wiper blade 11 and a holder section 12 for holding the wiper blade 11, with a reciprocating arm 13 attached to the holder section 12.

The wiper blade 11 has two blade sections 14, 14, each having a generally triangular cross section that is thick at the root portion thereof and thin at the tip portion thereof. The wiper blade 11 having two blade sections 14, 14 can be replaced with a wiper blade composed of only one blade section (not shown in the drawings). The two illustrated blade sections 14, 14 are integrated together at their root portions, and a liquid-supply passage 15 is provided at the root portion between the blade sections to supply windshield washing liquid therethrough. The liquid-supply passage 15 is closed and opened to allow the windshield washing liquid to flow out between the blade section when projecting portions 16, 16 of the integrated root portions of the blade sections come in contact with each other and are separated from each other, respectively.

A fitting section 18 is provided in a portion of the wiper-blade outside recess portions 17 of the integrated root portion of the two blade sections 14, 14, in the longitudinal direction of the wiper blade 11. The fitting section 18 is shown as recess grooves formed in the corresponding sides of the fitting section 18 in the longitudinal direction so that elastic bending plates 20 attached to the holder section 12 can be fitted into the grooves. Each elastic bending plate 20 has a mating portion 21 that can be inserted into the corresponding recess groove.

Figure 2:
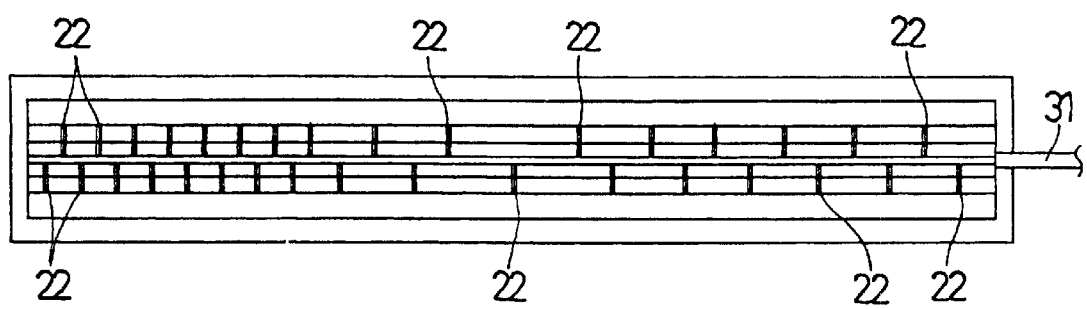
FIG. 2 is a bottom view of the embodiment.

The wiper blade 11 has notched portions 22 formed in the two blade sections 14, 14 at required intervals so that the notched portions of one of the blades do not overlap those of the other in the wiping direction. The notched portions 22 are formed at smaller intervals at the ends of the blade sections, which are likely to come into contact with a curved surface of a large curvature, and at larger intervals in an intermediate portion thereof (see FIG. 2). The notched portions 22, however, need not be formed at similar intervals at the both ends.

The wiper blade 11 is bent into a desired bent shape by means of the elastic bending plates 20. Thus, the elastic bending plates 20 are obtained by bending plate-shaped members with spring characteristics into a desired bent shape in advance. In the illustrated example, the wiper blade has a stronger elastic force in the intermediate portion of its overall length than at the both ends thereof. Accordingly, the intermediate portion does not bend easily, whereas the ends are flexible and bend easily so as to follow a curved surface to be wiped.

The elastic bending plates 20 are attached to the holder section 12 by fitting their outer portions into holding sections 23 formed on the inner surfaces of the holder section 12. The holder section 12 is composed of two members 24 and 25 that are formed forward and rearward in the wiping direction and are integrated, in the center of the holder section, with a joining member 26 by means of joining means shown as fitting recess portions 27. Additionally, the holder section 12 has holder notched portions 28 formed therein at required intervals in the longitudinal direction of the wiper blade 11. Like the notched portions 22 of the blade section 14, 14, these notched portions 28 are formed so that the holder section bends easily at the ends thereof but not in the intermediate portion thereof.

Figure 3:
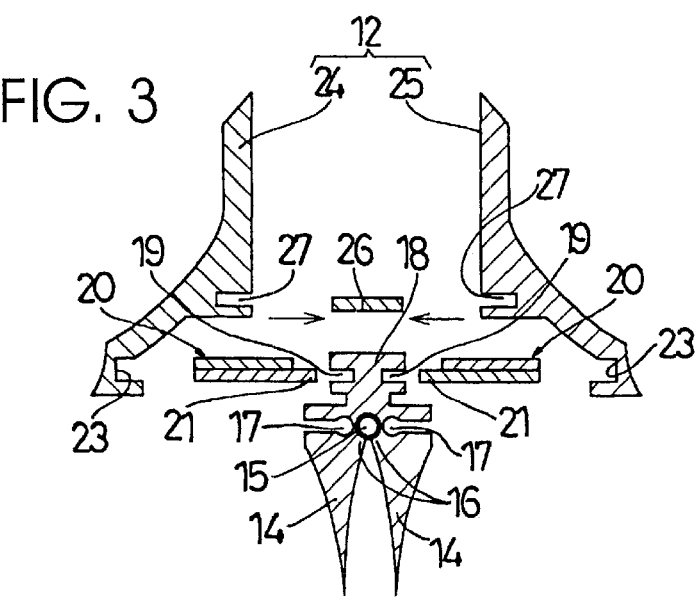
FIG. 3 is an exploded cross sectional view of the embodiment.

The holder section 12 has a generally triangular cross section (see FIG. 3) that is symmetrical in the reciprocating direction. Thus, wiping operations are stable, and when the device is operated during high-speed driving, the holder section uniformly receives wind pressure and the blade sections 14, 14 are pressed against the curved surface to serve as wipers, by means of an air current.

In connection with the holder section 12, a liquid-supply pipe 30 is provided that supplies windshield washing liquid to a liquid-supply passage 15. The device shown in FIGS. 1 to 5 has a single liquid-supply passage, to which the windshield washing liquid is supplied through a liquid pipe 31 connected to an end of the liquid-supply passage. This eliminates the need for windshield washing nozzles on the hood, which are essential in conventional automobiles, and allows a significantly larger amount of liquid to be supplied more accurately.

Figure 12:
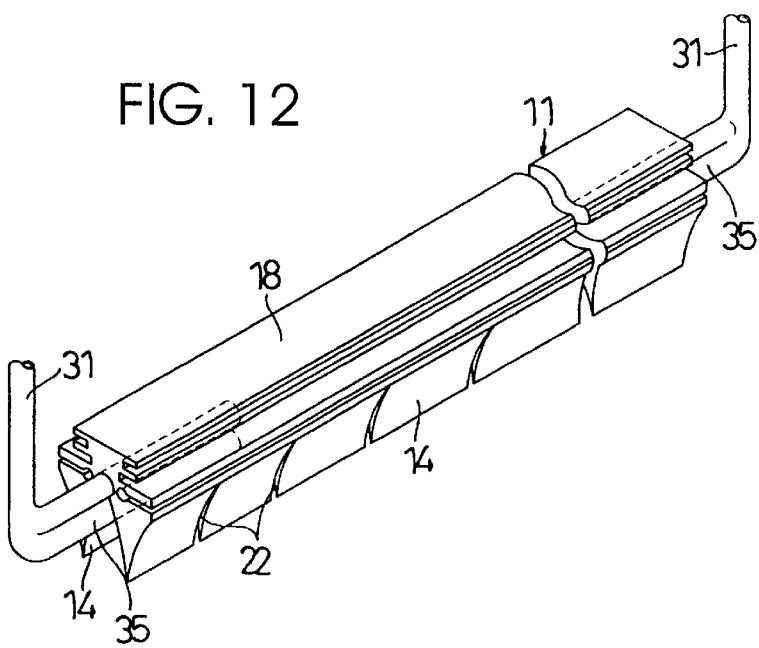
FIG. 12 is a perspective view showing a fourth example of the liquid-supplying piping system.
Figure 13:
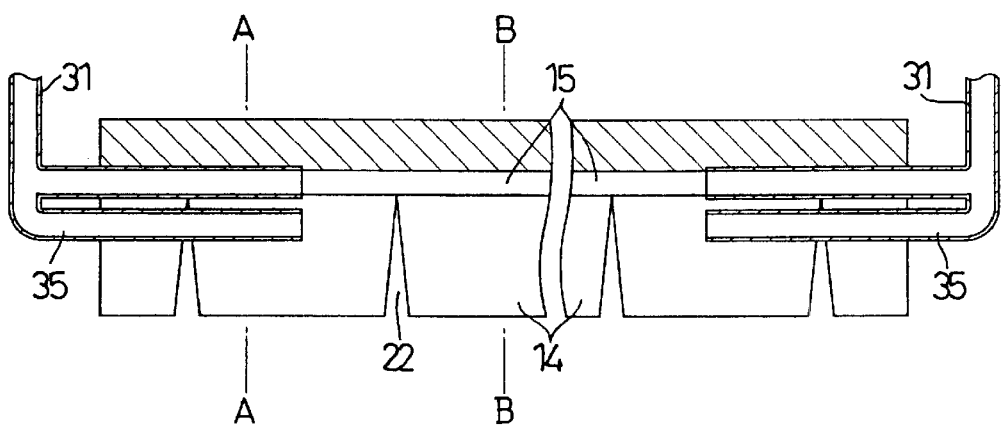
FIG. 13 is a vertical sectional view of the fourth example.
Figure 14A:
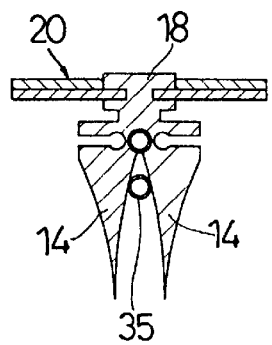
FIG. 14(a) is a sectional view taken along line A—A in FIG. 13.
Figure 14B:
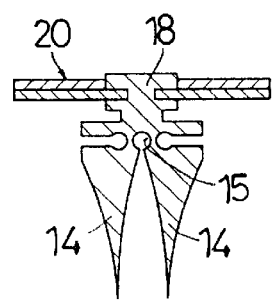
FIG. 14(b) is a sectional view taken along line B—B in FIG. 13.

FIGS. 6 to 8 show an example 2 in which a liquid-supply pipe 32 is disposed immediately before the liquid-supply passage 15 so that the liquid is supplied to the liquid-supply passage 15 through nozzles 33 formed in the liquid-supply pipe 32. In this example, when the liquid flows out from the liquid-supply passage 15 to between the blades, it pushes open opposite projecting portions 16, 16 by means of water pressure so as to open a curtain. FIGS. 9 to 11 show an example 3 in which, in contrast to the single liquid-supply pipe 31 in the embodiment 1 shown in FIG. 3, the two liquid-supply pipes 31 are connected to the corresponding ends of the liquid-supply passage 15 at connection portions 34 thereof. The form in which the liquid flows out in the example 3 is the same as that in the embodiment 1. FIGS. 12 to 14 show an example 4 in which a second liquid-supply passage 35 is disposed between the blade portions 14, 14; the second liquid-supply passage 35 branches from the same liquid pipe 31. The second liquid-supply passage 35 is suitable for applications that require a significantly soiled curved surface to be cleaned, as it enables the supply of a large amount of liquid.

Figure 15:
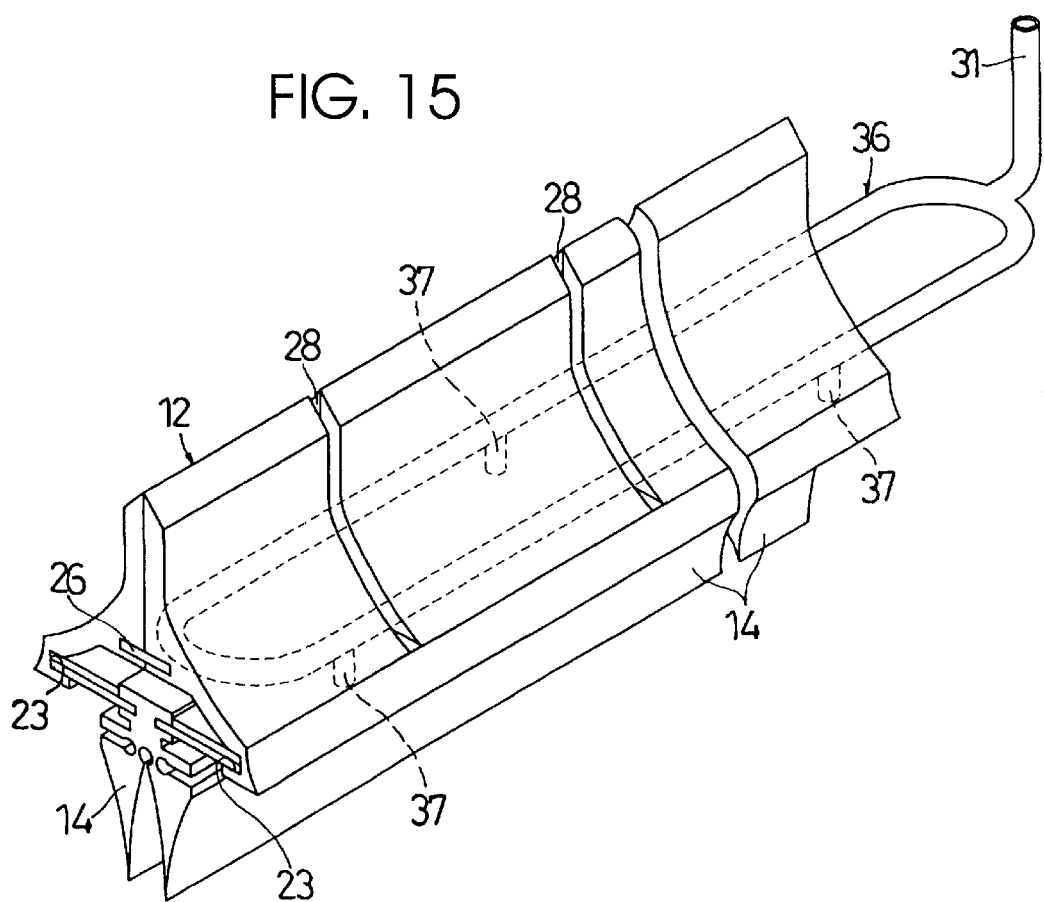
FIG. 15 is a perspective view showing a fifth example of the liquid-supplying piping system.
Figure 16A:
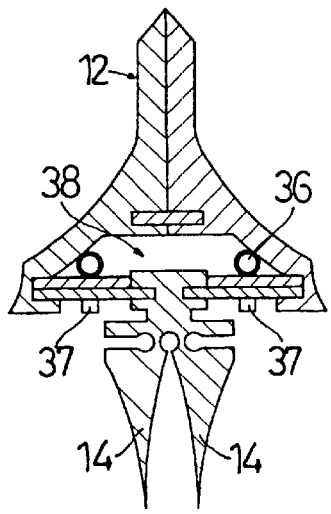
FIG. 16(a) is a cross sectional view of FIG. 14(a)
Figure 16B:
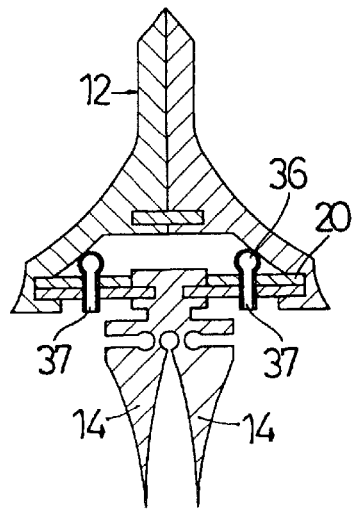
FIG. 16(b) is a cross sectional view of FIG. 14(b).

FIG. 15 and the subsequent figures show an example 5 in which the device has a loop-like liquid-supply pipe 36. The loop-like liquid-supply pipe 36 receives a supplied liquid through the liquid pipe 31, and ejects it through nozzles 37. The nozzles are not located between the blades but outside the two blades 14, 14, and supply the liquid directly to the curved surface to be wiped. The loop-like liquid-supply pipe 36 is accommodated in an attachment void 38, and the nozzles 37 are fitted into holes formed in the elastic bending plates 20 (FIG. 16(b)).

With this configuration, the blade section 14 of the wiper blade device 10 bends so as to follow even a curved surface S to be wiped that has a large curvature at the ends thereof; it comes in contact with the curved surface. This contact is achieved by means of the elastic bending plates 20, which are formed using a spring material composed of steel (spring steel plate), phosphor bronze, or the like. To achieve both easy bending and recovery of the elastic bending plate at the end thereof and the rigidity of the intermediate portion thereof, two plates are laid on top of each other in the intermediate portion, whereas a single plate is provided at the end. An arbitrary number of plates may be used; for example, three plates in the intermediate portion and one plate at the end, four plates in the intermediate portion and two plates at the end, or the like. That is, the elastic bending plates 20 have only to differ in bending force between their intermediate portions and ends.

Effects of the Invention

As the present invention is configured and operates as described above, it comes in contact even with a large-curvature curved surface to be wiped, by being deformed so as to follow this surface, due to the notched portions formed in the blade sections at the required intervals and the previously bent elastic bending plates. The present invention thus has the effect of more completely wiping a significantly curved surface such as that of an automobile windshield. Further, if, in connection with the blade sections, a liquid-supply pipe is incorporated or an arrangement for allowing a windshield washing liquid or the like to flow out is added, the liquid is prevented from being wasted, thus significantly improving the cleaning effect. Furthermore, the present invention is characterized in that the device operates stably even during high-speed driving when the holder section has a generally triangular cross section.

What is claimed is:

1. A wiper-blade device comprising a wiper blade having blade sections with notched portions formed therein and a holder section for holding the wiper blade, a bent shape for the blade sections being provided by elastic bending plates attached to the holder section to which the blade sections are attached, and the blade sections each have a more sharply bent shape at ends thereof than in other portions, the elastic bending plates include spring materials laid on top of each other and being composed of one of spring steel plates and phosphor bronze plates, and the elastic bending plates being weaker at an end thereof than in an intermediate portion thereof.

2. The wiper-blade device according to claim 1, wherein the holder section has notches formed therein at intervals in a longitudinal direction of the wiper blade so as to bend the notched portions of the blade sections.

3. A wiper-blade device comprising:

a wiper blade having a double-blade structure and blade sections with notched portions formed therein, the notched portions being formed in each blade section at intervals to allow each blade section to bend easily so as to follow a curved surface to be wiped, and the notched portions being disposed so that the notched portions of one of the blade sections do not overlap the notched portions of one of other of the blade sections in a wiping direction, a bent shape for the blade sections being provided by elastic bending plates attached to a holder section to which the blade sections are attached, and the blade sections each have a more sharply bent shape at ends thereof than in other portions of the blade sections, and the holder section having notched formed therein at intervals in a longitudinal direction of the wiper blade so as to bend as the notched portions of the blade section are bent, and the elastic bending plates including spring materials laid on top of each other and composed of one of spring steel plates and phosphor bronze plates, and the elastic bending plates being weaker at ends thereof than in an intermediate portion thereof.

* * * * *